US008285717B2

(12) United States Patent
Walmer

(10) Patent No.: US 8,285,717 B2
(45) Date of Patent: Oct. 9, 2012

(54) STORAGE OF ADVERTISEMENTS IN A PERSONAL ACCOUNT AT AN ONLINE SERVICE

(75) Inventor: Linda Walmer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 12/145,520

(22) Filed: Jun. 25, 2008

(65) Prior Publication Data

US 2009/0327251 A1 Dec. 31, 2009

(51) Int. Cl.
*G06F 17/30* (2006.01)
*G06Q 30/00* (2012.01)

(52) U.S. Cl. ........ 707/732; 707/737; 705/14.54; 705/14.73

(58) Field of Classification Search .......... 707/732–734, 707/948, 737, 944; 705/14.54, 14.73
See application file for complete search history.

(56) References Cited

U.S. PATENT DOCUMENTS

| | | | | |
|---|---|---|---|---|
| 2002/0082941 A1* | 6/2002 | Bird | | 705/26 |
| 2003/0158777 A1* | 8/2003 | Schiff et al. | | 705/14 |
| 2004/0210458 A1 | 10/2004 | Evans et al. | | |
| 2004/0260577 A1* | 12/2004 | Dahlin et al. | | 705/2 |
| 2005/0114183 A1 | 5/2005 | DiGiovanna et al. | | |
| 2005/0222989 A1* | 10/2005 | Haveliwala et al. | | 707/3 |
| 2005/0256867 A1* | 11/2005 | Walther et al. | | 707/5 |
| 2005/0278537 A1* | 12/2005 | Kirkland et al. | | 713/182 |
| 2006/0111943 A1 | 5/2006 | Wu | | |
| 2006/0136270 A1 | 6/2006 | Morgan et al. | | |
| 2006/0277075 A1 | 12/2006 | Salwan | | |
| 2007/0061170 A1 | 3/2007 | Lorsch | | |
| 2007/0100697 A1 | 5/2007 | Kolla | | |
| 2007/0124178 A1* | 5/2007 | Lee | | 705/3 |
| 2007/0136657 A1* | 6/2007 | Blumenthal et al. | | 715/512 |
| 2007/0282632 A1 | 12/2007 | Sachs | | |
| 2008/0021739 A1 | 1/2008 | Brock | | |
| 2009/0044147 A1* | 2/2009 | Alringer | | 715/810 |

OTHER PUBLICATIONS

Kaufman, "Personal Health Records Moving Online", Nov. 26, 2007, NPR, pp. 2.
"SynaMed Is Proud to Announce Free On-Line Personal Health Record", Apr. 7, 2008, SYS-CON Publications, Inc., pp. 3.
Fried, "Microsoft Plans Medical-Record Service", Oct. 4, 2007, CNET Networks, Inc., pp. 3.

* cited by examiner

*Primary Examiner* — Shahid Alam
*Assistant Examiner* — James E Richardson
(74) *Attorney, Agent, or Firm* — Alleman Hall McCoy Russell & Tuttle LLP

(57) ABSTRACT

A system for use in storage of advertisements in a personal account at an online service is provided. The online service may be configured to serve data to a client device to cause the client device to display a graphical user interface. The system may include a search interface to receive a search query input by a user and to display search results and one or more advertisements generated from a search engine of the online service in response to the search query, a selector configured to receive a user command to save a selected advertisement in the personal account for later viewing and/or traversal of a hyperlink embedded in the advertisement, and a personal account interface to display a saved advertisement in the personal account.

18 Claims, 3 Drawing Sheets

ADVERTISEMENT ADDITION SCREEN

ADD LINK TO YOUR SCRAPBOOK
YOU CAN ORGANIZE SAVED LINKS BY APPLYING TAGS TO THEM. YOU CAN USE ANY WORD OR SHORT PHRASE AS A TAG. FOR EXAMPLE, YOU MIGHT TAG A LINK AS "DISCUSS WITH DOCTOR." TAGS ARE OPTIONAL.

TITLE: CONTROLLING HIGH BLOOD PRESSURE
URL: URL1
DESCRIPTION: MIGHT BE GOOD FOR DAD
APPLYING AN EXISTING TAG: HIGH BLOOD PRESSURE, BOOK, STORE1
ADD A TAG (OPTIONAL): DAD, BOOK

OK    CANCEL

FIG. 2

SCRAPBOOK PANE

MY SCRAPBOOK                                       DELETE ALL | SEND TO
REFINE BY TAGS: HIGH BLOOD PRESSURE, ARTICLE, BOOK, STORE1, STUDY | ALL TAGS

| DATE | LINK | TAGS |
|---|---|---|
| 3/12/2008 | CONTROLLING HIGH BLOOD PRESSURE<br>*MIGHT BE GOOD FOR DAD*<br>BOOK AT STORE1<br>DELETE  EDIT | HIGH BLOOD PRESSURE<br>BOOK<br>STORE1 |
| 2/15/2008 | AD1 IMG<br>PRODUCT AT STORE2<br>DELETE  EDIT | SUPPLEMENT |
| 9/7/2007 | SEARCH RESULT 1<br>URL<br>DELETE  EDIT | HIGH BLOOD PRESSURE<br>ARTICLE |

FIG. 3

STORAGE OF ADVERTISEMENTS IN A PERSONAL ACCOUNT AT AN ONLINE SERVICE

BACKGROUND

Advertisements may provide useful information to a user of an online service. For example, in the healthcare context, advertisements may be generated along with search results by a search engine of a health-related online service in response to a health related search query. Such advertisements may include links to target information on health related goods and services such as books, medical devices, pharmaceuticals, medical services which are related to the health related search query. These advertisements and their linked target information may complement unsponsored search results, by providing important information on commercially available goods and services.

One drawback with online advertising, however, is that it is fleeting, disappearing when the user browses to a different website. Thus, advertisement information may be lost unless the user selects the advertisement during the search session, by clicking an embedded hyperlink in the advertisement. Alternatively, a user may print out the advertisement, write the name of the goods or services down, or otherwise attempt to manually record information about the advertisement, but such manual methods suffer from the drawback that they are time intensive and do not retain a record of any content that is linked by hyperlink to the advertisement. The fleeting nature of online advertising is a barrier to its potential effectiveness as an information source for users, and as a revenue generation tool for advertisers.

SUMMARY

A system for use in storage of advertisements in a personal account at an online service is provided. The online service may be configured to serve data to a client device to cause the client device to display a graphical user interface. The system may include a search interface to receive a search query input by a user and to display search results and one or more advertisements generated from a search engine of the online service in response to the search query, a selector configured to receive a user command to save a selected advertisement in the personal account for later viewing and/or traversal of a hyperlink embedded in the advertisement, and a personal account interface to display a saved advertisement in the personal account.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a schematic view an advertisement addition screen of a graphical user interface displayed on a client device of the system of FIG. 1.

FIG. 3 is a schematic view of a scrapbook pane of the personal account interface of the graphical user interface displayed on the client device of the system of FIG. 1.

DETAILED DESCRIPTION

Figure 1:
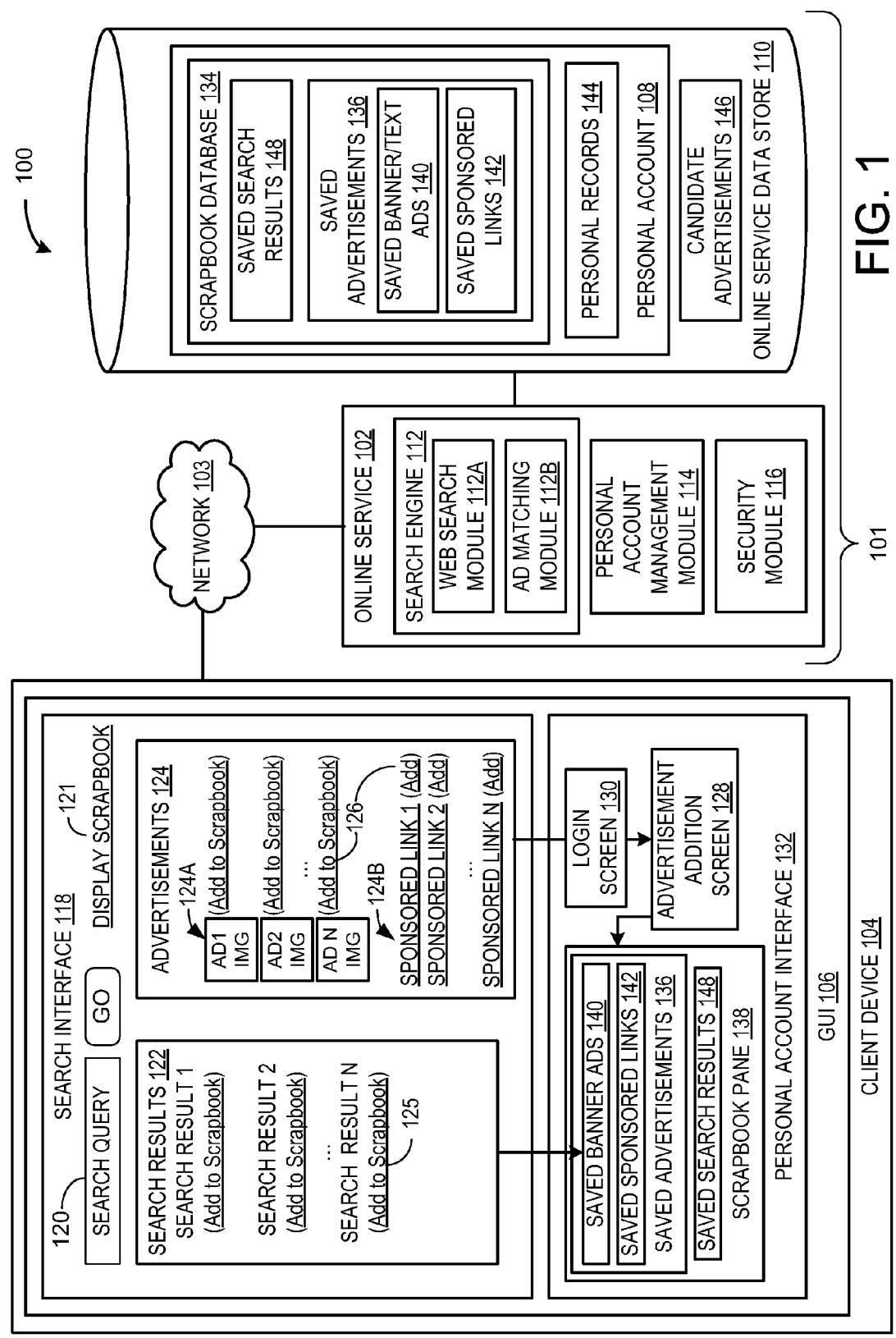
FIG. 1 is a schematic view of an embodiment of a system for use in storage of advertisements in a personal account at an online service.

FIG. 1 illustrates a system 100 for use in storage of advertisements in a personal account 108 at an online service 102 executed on a server 101. The online service 102 may, for example, be a health information service configured to provide health related search results and online advertisements to a user in response to a user search query, and to enable the user to store the advertisements in the personal account for later viewing and click-through.

The online service 102 is configured to serve data to a client device 104 to cause the client device 104 to display a graphical user interface (GUI) 106. The GUI 106 may include a search interface 118 configured to receive a search query input by a user via a search query input tool 120. The search query may be transmitted from the search interface to a search engine 112, which generates and returns search results 122 and one or more advertisements 124 to the search interface 118. It will be appreciated that the search engine 112 is configured with a web search module 112A configured to search hyperlinked web resources indexed by web crawlers and return search results 122, and also includes an advertisement matching module 112B configured to search candidate advertisements 146 and return one or more matching advertisements 124 for display on the search interface 118. The search interface 118, in turn, is configured to display the search results 122 generated by the web search module of the search engine 112 and one or more advertisements 124 generated by the advertisement matching module of the search engine 112 of the online service 102 in response to the search query.

The advertisements 124 displayed on search interface 118 and may be, for example, banner advertisements 124A that include an image element and a hyperlink to linked content, or sponsored links 124B, which are text advertisements that include a text element and a hyperlink to linked content. The advertisements 124 may be served from a database of candidate advertisements 146 stored within online service data store 110, or from third party advertising servers, for example. The linked content may be a web page or other web resource served by a third party server, which may, for example, be operated by an advertiser that has placed the advertisement 124.

The GUI 106 may further include an advertisement selector 126 corresponding to each of the plurality of advertisements 124, which may be in the form of a hyperlink, a button, etc. The selector 126 may be configured to receive a user command to save a selected advertisement as a saved advertisement 136 in the personal account 108 for later viewing and/or traversal of the hyperlink embedded in the saved advertisement 136.

Selection of the selector 126 may be configured to cause the display of a personal account interface 132 served by a personal account management module of the online service 102. To ensure secure access to the online service 102, a login screen 130 may be displayed as part of the personal account interface 132. If the user is not already securely logged into the online service 102, the selector 126 may be configured to cause the display of the login screen 130 for the personal account prior to display of an advertisement addition screen 128, discussed below. The login screen 130 may be configured to enable the user to securely login, for example, by inputting a username and password. It will be appreciated that the login screen 130 may be served by a security module 116 of the online service 102. The security module 116 further may be configured to display a security alert that warns of an exit of a privacy secured website hosted by the online service, for example, when the user selects a hyperlink embedded in a saved advertisement in the personal account displayed in a scrapbook pane 138 of the personal account interface, as discussed below.

Once the user has successfully logged in, the personal account interface 132 is configured to enable the user to save advertisements in the personal account 108, and to view saved advertisements 136. The personal account interface 132 may include an advertisement addition screen 128 for saving a selected advertisement 124. The advertisement addition screen 128 may be configured to receive metadata to be saved with the advertisement in the online service data store 110. An example of an advertisement addition screen 128 is illustrated in FIG. 2, discussed below.

The metadata that may be input into the advertisement addition screen 128 may include a title, a textual description, and/or keyword tags associated with the advertisement, for example. Other metadata such as advertiser name, product name, price, validity period, etc., may also be gathered by the advertisement addition screen 128, as appropriate. It will be appreciated that some metadata may be received as user input into the advertisement addition screen, and other metadata may be programmatically derived from embedded sources within the advertisement 124. Another form of metadata that may be associated with each advertisement is a link to one or more personal records 144 or other information within the personal account 108, thereby enabling the saved advertisements 136 to be linked to existing records in the personal account. These links may be established manually by the user via the advertisement addition screen, or programmatically according to present logic at the online service, and enable the saved advertisement to be redisplayed to the user when the user views the linked records in the personal account, for example. It will be appreciated that the metadata inputted or derived in this manner may be used, for example to organize, search, and present saved advertisements 136 via the personal account interface 132, as discussed below in relation to FIG. 2.

Following entry of the metadata via advertisement addition screen 128, the advertisement 124 may be saved as a saved advertisement 136 in a scrapbook database 134 of the personal account 108 by the personal account management module 114. It will be appreciated that the saved advertisements 136 may include saved banner advertisements 140 and saved sponsored links 142, as appropriate, corresponding to the types of advertisements 124 that are selected to be saved. Further, in some embodiments, the personal account interface 132 may also be configured to receive a user command to save the search results 122 as saved search results 148 in the personal account 108 on the online service data store 110. This user command may be received, for example, via a save search result selector 125 displayed on the search interface 118.

To enable a user to view saved advertisements 136, the personal account interface 132 may include a scrapbook pane 138 configured to display the saved advertisement 136 that are saved in the scrapbook database 134 of the personal account, including saved banner advertisements 140 and saved sponsored links 142. The scrapbook pane 138 may be accessed, for example, by selection of one of the selectors 126 and negotiating the login screen 130 and advertisement addition screen 128, for example, or by selecting a display scrapbook link 121 on the search interface 118, or by other suitable access mechanism.

As discussed above, the saved advertisements 136 may be organized, searched, and presented via the scrapbook pane 138, based on the metadata stored in the scrapbook database 134 with the saved advertisements 136. Therefore, it will be appreciated that searching, sorting, and filtering tools may be included on the scrapbook pane 138 for selecting the saved advertisements 136 to be displayed. It will also be appreciated that the scrapbook pane 138 may be configured to selectively display saved search results 148, if desired by the user. An example scrapbook pane 138 is illustrated in FIG. 3, discussed below.

In addition to the saved advertisements 136 and saved search results 148, the personal account 108 may also be configured to store a user's personal records 144, which may be portable personal health records containing data regarding a user's health history, diagnoses, prescriptions, etc. It will be appreciated that only the user and other authorized users, such as authorized healthcare professionals or family members, may have access to the personal account 108.

FIG. 2 illustrates an example instance of the advertisement addition screen 128, configured to be displayed upon selection of selector 126 and login of a user, and configured to receive metadata related to the selected advertisement. The advertisement addition screen 128 may include a title field 152 for receiving input of a title of the advertisement, and a URL field 154 for receiving input of a URL of the embedded hyperlink in the advertisement. The title and URL of the selected advertisement 124 may be programmatically detected when selector 126 is selected based on metadata embedded in the selected advertisement 124, and may be displayed in the title field 152 and URL field 154. Alternatively, the user may input or manually edit the prefilled title and URL. The advertisement addition screen 128 may further include a description field 156 configured to receive a textual description of the advertisement from the user. The advertisement addition screen may further include a tag input field 160 for receiving user input of keyword tags to be associated with the selected advertisement 124. For convenience, a tag menu 158 populated with existing tags that have been used with other saved advertisements 136 in the scrapbook database 134 of the personal account 108 may be displayed, and the user may click on an existing tag in the tag menu 158 to add the tag to the tag input field 160.

Once the user has input the desired metadata into the various fields of advertisement addition screen 128, the user can save the selected advertisement by clicking an OK button 161. This causes the personal account interface 132 to send the metadata and advertisement 124 to the personal account management module at online service 102, which in turn saves the advertisement and metadata in personal account 108 on online service data store 110. The scrapbook pane 138 may be displayed following the save operation, or alternatively, the search interface 118 may be displayed, if desired.

FIG. 3 shows an example instance of the scrapbook pane 138. The scrapbook pane 138 may be configured to present a list 168 of scrapbook database contents, including one or more saved advertisements 136 such as saved banner advertisements 140, saved sponsored links 142, and saved search results 148. The list 168 may be filtered by tags that have been defined by the user, via tag input field 160 of FIG. 2, for example. To accomplish this, the scrapbook pane may include a list filter tool 177, configured to filter the contents of list 168 to include only saved advertisements 136 with tags that match user specified tags. It will be appreciated that the user may select tags for matching by clicking on the programmatically generated tag list 178 in the list filter tool 177, thereby toggling on and off tags to be matched. The specified tags may be underlined in the tag list 178, when selected for matching. An "ALL TAGS" selector may be included in the tag list to select all tags for matching. It will be appreciated that the list filter tool 177 may alternatively or additionally include selectors for specifying other parameters for filtering list 168, such as whether to include or exclude saved banner advertisements 140, saved sponsored links 142, or saved search results 148 in the list 168. In other embodiments, the list filter tool 177 may also include a date range selector to further filter the results by a user specified date.

The list 168 may be sorted by date 172, embedded hyperlink 174, and/or matching tags 176 of the saved advertisements 136, which are illustrated as headers in columns of the list 168. It will be appreciated that these headers are configured to enable a user to click on a selected header to input an ascending sort or descending sort command based on the data type featured in the selected header.

Regarding the content of list 168, for each saved advertisement 136 in list 168, a date on which the advertisement was added to the scrapbook database is listed in the date column. In the tag column, user specified tags associated with the advertisement are displayed. In the hyperlink 174 column, for saved textual advertisements and saved sponsored links, a title with an embedded hyperlink 174 is listed, along with the textual description for the saved advertisement, if any has been entered via description field 156. For saved banner advertisements, an image with an embedded hyperlink may be displayed. Further, type and source metadata 170 regarding the item type (e.g. product, article, web resource, etc.) and source (e.g., retailer, institute, healthcare provider website, etc.) is displayed, which may be gathered from metadata embedded in the advertisement itself. For saved search results, a title and URL may be listed, as shown.

It will be appreciated that the user may choose to traverse a hyperlink 174 in a saved advertisement displayed in the list 168, in order to traverse to linked content to which the hyperlink points. In this manner, the advertisement may remain effective over a period of time beyond the initial impression in the search interface 118, since the advertisement may be saved and later may be displayed and receive a click-through by the user. Thus, in addition to offering convenience to a user, such an approach may contribute to the click through rates and overall effectiveness of an advertisement.

The user interface in FIG. 3 may also be configured to enable the user to take additional actions on the saved advertisements. For example, the user may edit metadata associated with a saved advertisement by actuating an edit selector 180 or delete a saved advertisement by actuating a delete selector 181. Further, the user may send a saved advertisement out to be shared with others by actuating a send to selector 182, which may cause a send interface to be displayed for transmitting one or more of the saved advertisements to a recipient. The send interface may be configured to receive a personal message from the user to send to the recipient along with the saved advertisement. The advertisement may be sent to the recipient, for example, by transmitting the advertisement to a secure personal account of the recipient on the online service. Alternatively, the advertisement may be sent via secure email to the recipient, for example. A delete all selector 183 may also be provided to enable a user to delete all saved advertisements 136 and saved search results 148 in the list 168.

Figure 4:
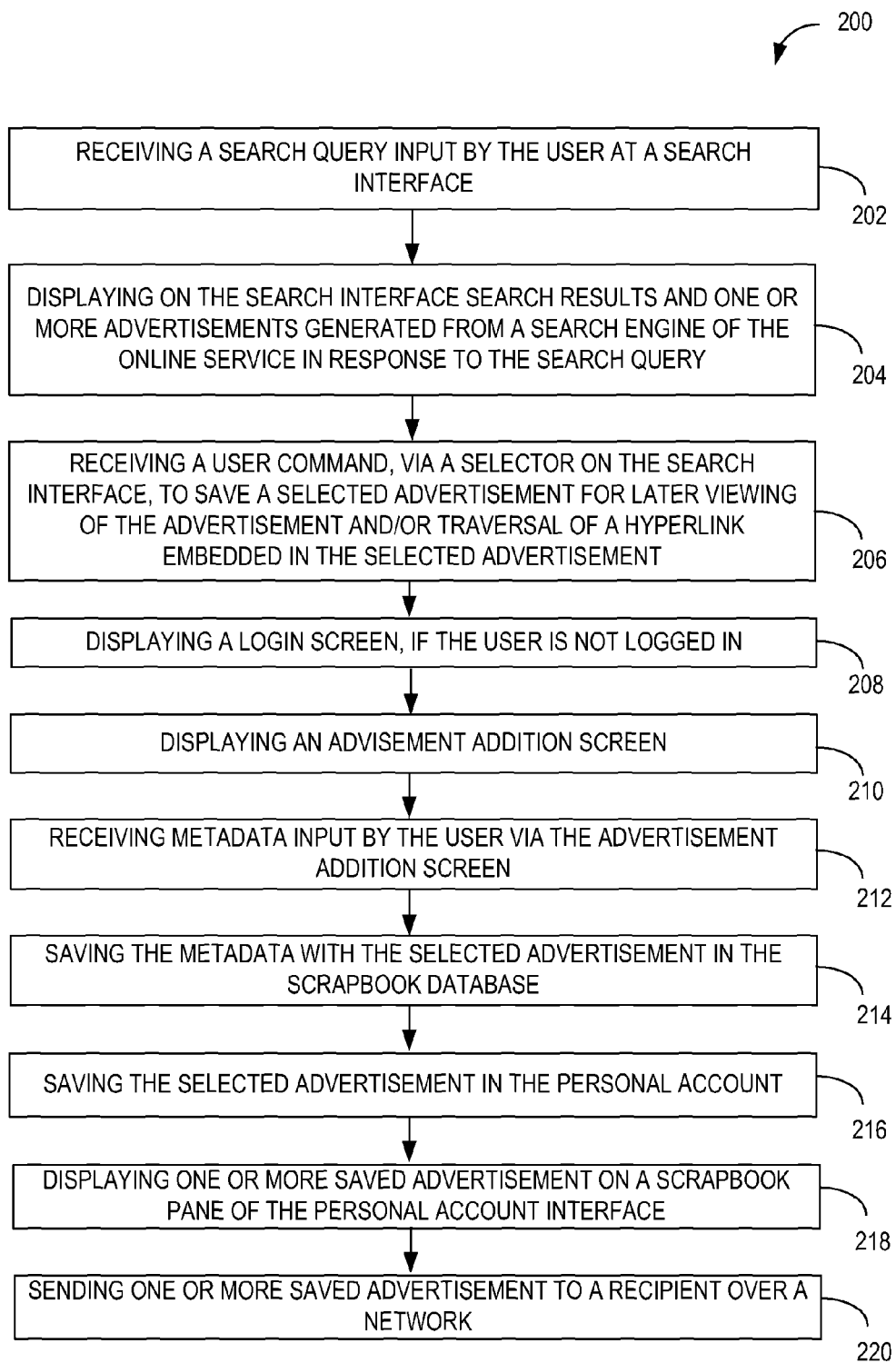
FIG. 4 is a schematic view of an embodiment of a method for storing advertisements in a personal account at an online service.

FIG. 4 shows one embodiment of a method 200 for storing advertisements in a personal account of an online service. The method may be implemented using the hardware and software components of the systems described above, or by other suitable hardware and software. Thus, for example, the method may be implemented at an online service executed on a server, the online service being configured to serve data to a client device to cause the client device to display a graphical user interface. As a more specific example, the online service may be a health information service configured to provide health related information via a search engine and to store personal health records in the personal account.

As illustrated at 202, the method may include receiving a search query input by the user at a search interface of the graphical user interface. At 204, the method may further include displaying on the search interface search results and one or more advertisements generated from a search engine of the online service in response to the search query. The advertisement may be selected from among at least two candidate advertisements based on contents of the personal health account. For example, the advertisement may be selected based on other saved advertisements or saved search results in the personal account. It will be appreciated that the advertisement may be a banner advertisement or a sponsored link, which is a textual advertisement. Therefore, the advertisement may include an image element and a hyperlink element, or a text element and a hyperlink.

At 206, the method may include receiving a user command, via a selector on the search interface, to save a selected advertisement for later viewing of the advertisement and/or traversal of a hyperlink embedded in the selected advertisement. At 208, if the user is not securely logged into the personal account at the online service, the method may include displaying a login screen to allow the user to log into the user's personal account, prior to display of an advertisement addition screen. At 210, the method may include, in response to receiving the user command at 206, displaying an advisement addition screen.

At 212, the method may include receiving metadata input by the user via the advertisement addition screen. At 214, the method may include saving the metadata with the selected advertisement in the scrapbook database. The metadata may include one or more of a title, a textual description, and keyword tags, or other suitable metadata as described above, and may be alternatively received via a suitable interface other than an advertisement addition screen. At 216, the method may include saving the selected advertisement in the personal account. The selected advertisement may, for example, be saved in a scrapbook database of the personal account.

At 218, the method may include displaying one or more saved advertisements on a scrapbook pane of a personal account interface of the graphical user interface. The saved advertisements as displayed may be, for example, in the form of a banner advertisement or sponsored link, as described above, and thus may include an image element and a hyperlink, or a text element and a hyperlink. The hyperlink in a saved advertisement may point to linked content specified by the advertiser. Thus, by clicking on a saved advertisement displayed in the scrapbook pane, a user may browse to linked content specified by the advertiser.

At 220, the method may further include sending one or more saved advertisements to a recipient via the scrapbook pane of the personal account interface. The advertisement may be sent to the recipient, for example, by transmitting the advertisement to a secure personal account of the recipient on the online service. Alternatively, the advertisement may be sent via secure email to the recipient, for example.

The systems and methods described above may be utilized by a user to store an online advertisement in a personal account of an online service, for later retrieval. The advertisements may be viewed, edited, shared, or clicked through at a later time convenient for the user, thereby providing a convenient manner for the user to utilize the advertisements and potentially contributing to the efficacy of the advertisement for the advertiser.

It will be appreciated that the computing devices described herein typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above. The methods described herein may be performed in the order described, but are not so limited, as it will be appreciated by those skilled in the art that one or more steps of the method may be performed prior to, or after other steps, in alternative embodiments.

It will also be appreciated that the various components of the system provided herein may communicate directly or via a communication network, which may be or include a wide area network (WAN), a local area network (LAN), a global network such as the Internet, a telephone network such as a public switch telephone network, a wireless communication network, a cellular network, an intranet, or the like, or any combination thereof.

Further, although the embodiments illustrated herein have been described as storing the saved advertisements on the personal account at the online service data store, it will be appreciated that in other embodiments, the saved advertisements may be saved in on the user client device in a manner that is linked to the personal account. For example, the saved advertisements may be stored in a cookie stored on the user client device.

In addition, although the advertisements are described in the above embodiments as being selected and served in response to a user search query, it will be also appreciated that the advertisements may be served based on other models, such as an advertisement that is served based on the content of a web page that is viewed, or a non-contextual advertisement, etc. Further, while the online service is described above as being a health related information service in one embodiment, it should be understood that a wide variety other types of online services are contemplated. For example, the online service may be a television service configured to broadcast television programs and advertisements to the user client device, and the television advertisements may be configured to be saved by the user.

Finally, although a single user client device is depicted above, it will be appreciated that multiple user client devices may be provided, which are linked to the same personal account. Thus, in one use case scenario, a user may view and save an advertisement with a first user client device, such as a personal computer, and then later access the saved advertisement from a second user client device, such as a web-enabled mobile telephone.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A system for use in storage of store advertisements in a personal health account at an online health information service, the system comprising a server that includes a processor configured to execute instructions for the online health information service held in memory of the server, the online health information service being configured to serve data to a client device to cause the client device to display a graphical user interface comprising:
    a search interface to receive a search query input by a user and to display search results and one or more advertisements generated from a search engine of the online health information service in response to the search query;
    a selector configured to receive a user command to save a selected advertisement in the personal health account for later viewing and/or traversal of a hyperlink embedded in the selected advertisement, the personal health account configured to store the selected advertisement with one or more portable personal health records for the user, the selector configured to cause display of an advertisement addition screen configured to receive metadata to be saved with the selected advertisement, the metadata including a link to the one or more portable personal health records; and
    a personal account interface configured to display a saved advertisement in the personal health account, wherein the saved advertisement is displayed when the user views one of the one or more portable personal health records that is linked to the saved advertisement by the link included in the metadata of the saved advertisement.

2. The system of claim 1, wherein the personal account interface further includes a personal account search interface including a scrapbook pane configured to display the saved advertisement.

3. The system of claim 2, wherein the metadata includes one or more of a title, a textual description, and keyword tags.

4. The system of claim 3, wherein the selector is configured to cause the display of a login screen prior to display of the advertisement addition screen.

5. The system of claim 4, wherein the saved advertisement further includes, an image element and/or a text element.

6. The system of claim 1, wherein the saved advertisement is a sponsored link, text advertisement, or banner advertisement.

7. The system of claim 1, wherein the online health information service is configured to provide health related information via the search engine and wherein the personal health account may only be accessed by one or more of the user and an authorized healthcare professional.

8. The system of claim 1, wherein the personal account interface is configured to display a list of saved advertisements in a scrapbook pane, the scrapbook pane including a filter tool configured to filter the saved advertisements included in the list based on keyword tags.

9. The system of claim 1, further comprising a security module at the online health information service configured to cause display of a security alert that warns of an exit of a privacy secured website when the user selects the hyperlink embedded in the saved advertisement in the personal health account.

10. A method for storing advertisements in a personal health account of a user at an online health information service executed on a server, the online health information service being configured to serve data to a client device to cause the client device to display a graphical user interface, the method comprising:
  receiving a search query input by the user at a search interface of the graphical user interface;
  displaying on the search interface search results and one or more advertisements generated from a search engine of the online health information service in response to the search query;
  receiving a user command, via a selector on the search interface, to save a selected advertisement for later viewing of the selected advertisement and/or traversal of a hyperlink embedded in the selected advertisement;
  in response to receiving the user command, displaying an advertisement addition screen:
    receiving metadata input by the user via the advertisement addition screen, the metadata including a link to one or more portable personal health records for the user;
    saving the selected advertisement and the metadata in the personal health account, the personal health account configured to store the selected advertisement with the one or more portable personal health records for the user; and
    displaying the saved advertisement from the personal health account on a personal account interface, wherein the saved advertisement is displayed when the user views one of the one or more portable personal health records that is linked to the saved advertisement by the link included in the metadata of the saved advertisement.

11. The method of claim 10, wherein the metadata includes one or more of a title, a textual description, and keyword tags.

12. The method of claim 10, further comprising, displaying one or more saved advertisements in a scrapbook pane of a personal account interface of the graphical user interface.

13. The method of claim 12, further comprising, sending saved advertisements to a recipient, via the personal account interface.

14. The method of claim 10, wherein the online health information service is configured to provide health related information via the search engine and wherein the personal health account may only be accessed by one or more of the user and an authorized healthcare professional.

15. The method of claim 10, wherein the selected advertisement is selected from among at least two candidate advertisements based on contents of the personal health account.

16. The method of claim 10, wherein the saved advertisement includes an image element and a hyperlink element.

17. The method of claim 10, wherein the saved advertisement includes a text element and a hyperlink element.

18. A method for storing advertisements into a personal health account of a user at an online health information service executed on a server, the online health information service being configured to serve health information data to a client device to cause the client device to display a graphical user interface, the method comprising:
  receiving a search query input by the user at a search interface of the graphical user interface;
  displaying on the search interface search results and one or more advertisements generated from a search engine of the online health information service in response to the search query;
  receiving a user command, via a selector on the search interface to save a selected advertisement in the personal health account for later viewing of the selected advertisement and/or traversal of a hyperlink embedded in the selected advertisement;
  in response to the user command, displaying an advertisement addition screen;
  receiving metadata input by the user via the advertisement addition screen, the metadata including a link to one or more portable personal health records for the user;
  storing the selected advertisement and metadata in the personal health account, the personal health account including the one or more portable personal health records for the user; and
  displaying one or more saved advertisements from the personal health account in a scrapbook pane of a personal account interface, wherein each of the saved advertisements is displayed when the user views one of the one or more portable personal health records that is linked to the respective saved advertisement by a corresponding link included in the metadata of the saved advertisement.

* * * * *